(12) United States Patent
Kang (10) Patent No.: US 8,736,636 B2
(45) Date of Patent: May 27, 2014

(54) APPARATUS AND METHOD FOR PROVIDING AUGMENTED REALITY INFORMATION

(75) Inventor: Young-Jo Kang, Seoul (KR)

(73) Assignee: Pantech Co., Ltd., Seoul (KR)

( * ) Notice: Subject to any disclaimer, the term of this patent is extended or adjusted under 35 U.S.C. 154(b) by 301 days.

(21) Appl. No.: 12/869,179

(22) Filed: Aug. 26, 2010

(65) Prior Publication Data

US 2011/0187745 A1    Aug. 4, 2011

(30) Foreign Application Priority Data

Jan. 29, 2010  (KR) ........................ 10-2010-0008809

(51) Int. Cl.
*G09G 5/00*      (2006.01)
(52) U.S. Cl.
USPC ........... 345/633; 345/629; 345/630; 345/631; 345/632; 455/446; 455/447; 455/448; 455/449
(58) Field of Classification Search
USPC ............... 345/629–633; 455/414.1, 446–449; 382/181
See application file for complete search history.

(56) References Cited

U.S. PATENT DOCUMENTS

| 7,379,738 | B2 * | 5/2008 | Balasubramanian et al. .......................... 455/435.1 |
| 7,801,359 | B2 * | 9/2010 | Ackley et al. ................. 382/181 |
| 8,073,565 | B2 * | 12/2011 | Johnson ........................ 700/245 |
| 2006/0002610 | A1 | 1/2006 | Suomela et al. |
| 2008/0036570 | A1 * | 2/2008 | Kim et al. .................... 340/5.61 |
| 2009/0031006 | A1 | 1/2009 | Johnson |
| 2010/0008265 | A1 | 1/2010 | Freer |
| 2010/0328344 | A1 * | 12/2010 | Mattila et al. ................. 345/633 |
| 2011/0151955 | A1 * | 6/2011 | Nave ................................. 463/2 |
| 2011/0164163 | A1 * | 7/2011 | Bilbrey et al. ........... 348/333.01 |
| 2011/0177845 | A1 * | 7/2011 | Fasold .......................... 455/566 |

FOREIGN PATENT DOCUMENTS

| CN | 1957359 | 5/2007 |
| CN | 101582909 | 11/2009 |
| JP | 2009-170974 | 7/2009 |
| KR | 1020000054313 | 9/2000 |
| KR | 1020030078222 | 10/2003 |
| KR | 1020050078136 | 8/2005 |
| KR | 100836254 | 6/2008 |
| KR | 1020090044702 | 5/2009 |
| KR | 1020090062748 | 6/2009 |
| KR | 1020090106069 | 10/2009 |

OTHER PUBLICATIONS

Kimura et al., "System Support for Mobile Augmented Reality Services", SAC '07, Mar. 11-15, 2007, pp. 1616-1623.

(Continued)

*Primary Examiner* — Xiao Wu
*Assistant Examiner* — Todd Buttram
(74) *Attorney, Agent, or Firm* — H.C. Park & Associates, PLC (57) ABSTRACT

A system and method for providing augmented reality (AR) information to a mobile communication terminal in a mobile communication system is provided. If the mobile communication terminal is determined to have entered a service cell providing AR information, the mobile communication terminal transmits an AR information request including position information to a server. Upon receiving the AR information request signal, the server determines AR information including at least one tag pattern provided in the service cell and information associated with the tag pattern and transmits the AR information to the mobile communication terminal.

32 Claims, 8 Drawing Sheets

(56) References Cited

OTHER PUBLICATIONS

Rekimoto et al., "Cybercode: Designing Augmented Reality Environments with Visual Tags", Sony Computer Science Laboratories, Inc., 2000.

Burigat et al., "Location-aware Visualization of VRML Models in GPS-based Mobile Guides", Proceedings Web3D 2005, 10th International Conference on 3D Web Technology, 2005, pp. 57-64.

S J Vaughan-Nicholas, "Augmented reality: No longer a novelty?", Computer, IEEE Service Center, vol. 42, No. 12, Dec. 2009, pp. 19-22.

European Search Report of Nov. 29, 2010 in corresponding European Patent Application No. 10174133.8.

Chinese Office Action dated Apr. 2, 2013 Issued for Chinese Patent Application No. 201010511960.6.

Chinese Search Report submitted with Chinese Application 201010511960.6 dated Mar. 25, 2013.

* cited by examiner

APPARATUS AND METHOD FOR PROVIDING AUGMENTED REALITY INFORMATION

CROSS-REFERENCE TO RELATED APPLICATION

This application claims the priority from and benefit under 35 U.S.C. §119(a) of Korean Patent Application No. 10-2010-0008809, filed on Jan. 29, 2010, the disclosure of which is incorporated herein by reference for all purposes.

BACKGROUND

1. Field

The following description relates to an apparatus and method for providing augmented reality (AR) information.

2. Discussion of the Background

As mobile communication terminals equipped with various services and functions is have increasingly been released, service systems have been developed to provide users with a variety of information.

Recently, augmented reality (AR) technologies have been introduced to an information provider system using the mobile communication terminals to offer a live direct or indirect view of a physical real-world environment, whose elements are augmented by virtual computer-generated imagery.

Figure 1:
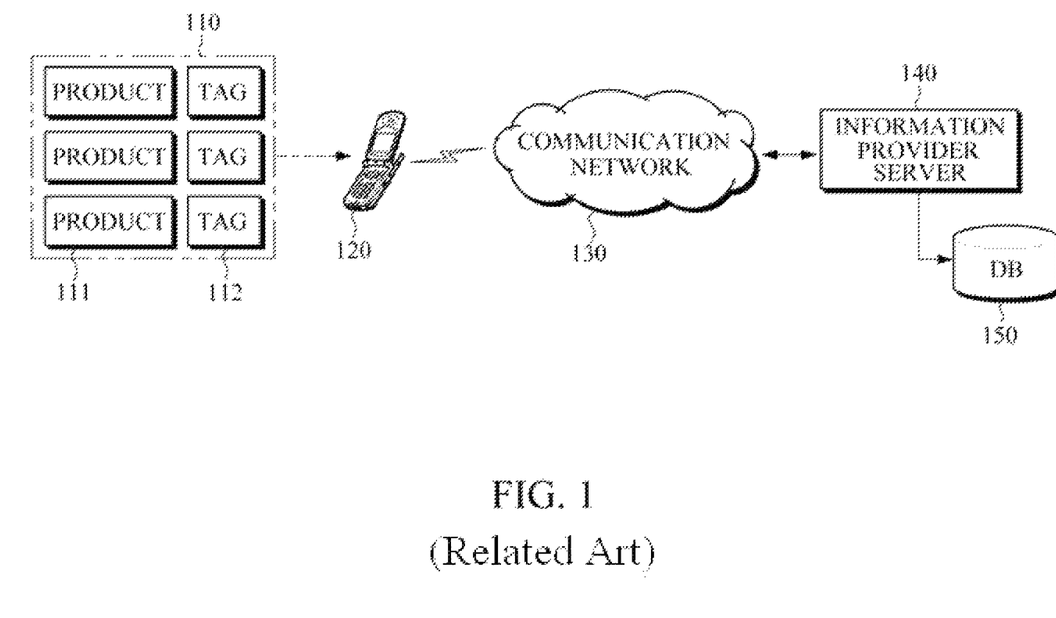
FIG. 1 is a schematic diagram illustrating an example of a conventional is information provider system using augmented reality.

A conventional information provider system using the AR technology to offer product information to users will be described with reference to FIG. 1. FIG. 1 is a schematic diagram illustrating an example of a conventional information provider system using augmented reality. Referring to FIG. 1, a mobile communication terminal 120 is equipped with a camera to take a picture of a tag pattern 112 attached to a product 111 in a product unit 110. The mobile communication terminal 120 transmits the tag pattern 112 to an information provider server 140 over a communication network 130. The information provider server 140 retrieves product information, including an external image, a price, and performance of the product 111, associated with the tag pattern 112 from a database 150 and transmits the product information to the mobile communication terminal 120. The mobile communication terminal 120 displays the product information on a screen.

In this case, however, since the mobile communication terminal 120 sends the tag pattern 112 to the information provider server 140, the information provider server 140 retrieves the product information from the database 150, the mobile communication terminal 120 receives the product information from the information provider server 140, and the mobile communication terminal 120 provides the product information to a user, it takes the user a long time to receive the product information.

Further, since the same product information is associated with each tag pattern 112, the same product information is provided to each user, which does not cater to users' diversified tastes and results in a low efficiency of the tag pattern.

In addition, due to limited storage capacity of the mobile communication terminal, storage capacity must be expanded or a user has to delete stored information to receive new information.

SUMMARY

Exemplary embodiments provide a method and apparatus for quickly providing augmented reality (AR) information corresponding to a tag pattern in a mobile communication system.

Exemplary embodiments provide a method and apparatus for providing augmented reality information in a mobile communication system, capable of increasing the efficiency of a tag pattern and catering to users' diversified tastes with a single tag pattern.

Exemplary embodiments provide a method and apparatus for providing augmented reality information, capable of continuously receiving desired information in limited storage provided in a mobile communication terminal.

Additional features of the invention will be set forth in the description which follows, and in part will be apparent from the description, or may be learned by practice of the invention.

An exemplary embodiment provides a method for providing augmented reality (AR) information, the method including: sending an AR information request including position information from a mobile communication terminal; receiving, in the mobile communication is terminal, the AR information including at least one tag pattern available in a service cell and information associated with the at least one tag pattern; and storing the received AR information in the mobile communication terminal.

An exemplary embodiment provides a method for providing augmented reality (AR) information, the method including: receiving an AR information request including position information from a mobile communication terminal; determining AR information including at least one tag pattern and information associated with the at least one tag pattern, the at least one tag pattern being available in a service cell in which the mobile communication terminal is located; and transmitting the AR information to the mobile communication terminal.

An exemplary embodiment provides a mobile communication terminal, including: a memory to store information; and a control unit to generate an augmented reality (AR) information request including position information of the mobile communication terminal if the mobile communication terminal is determined to have entered a service cell in which AR information is available, to receive the AR information in response to the AR information request, and to store the received AR information in the memory.

An exemplary embodiment provides a server to provide AR information to a mobile communication terminal, the server including: a database to store at least one tag pattern available in a service cell and information associated with the at least one tag pattern, and to store user information; and a control unit to classify interest groups based on the stored user information, and to extract the AR information according to the interest groups and the service cell in response to an AR information request, the AR information including the at least one tag pattern and the information associated with the at least one tag pattern.

An exemplary embodiment provides a mobile communication system, including: is a server to store augmented reality (AR) information, the AR information including at least one tag pattern available in a service cell and information associated with the at least one tag pattern; and a mobile communication terminal to receive and to store the AR information from the server upon entry of the mobile communication terminal into the service cell.

An exemplary embodiment provides a method for providing augmented reality (AR) information, the method including: sending an AR information request including position information from a mobile communication terminal; receiving the AR information request in a server; determining AR information including at least one tag pattern and information associated with the at least one tag pattern, the at least one tag pattern being available in a service cell in which the mobile communication terminal is located according to the position information; transmitting, from the server to the mobile communication terminal, the determined AR information; and storing the received AR information in the mobile communication terminal.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The invention is described more fully hereinafter with reference to the is accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. Also, descriptions of well-known functions and constructions may be omitted for increased clarity and conciseness.

Figure 2:
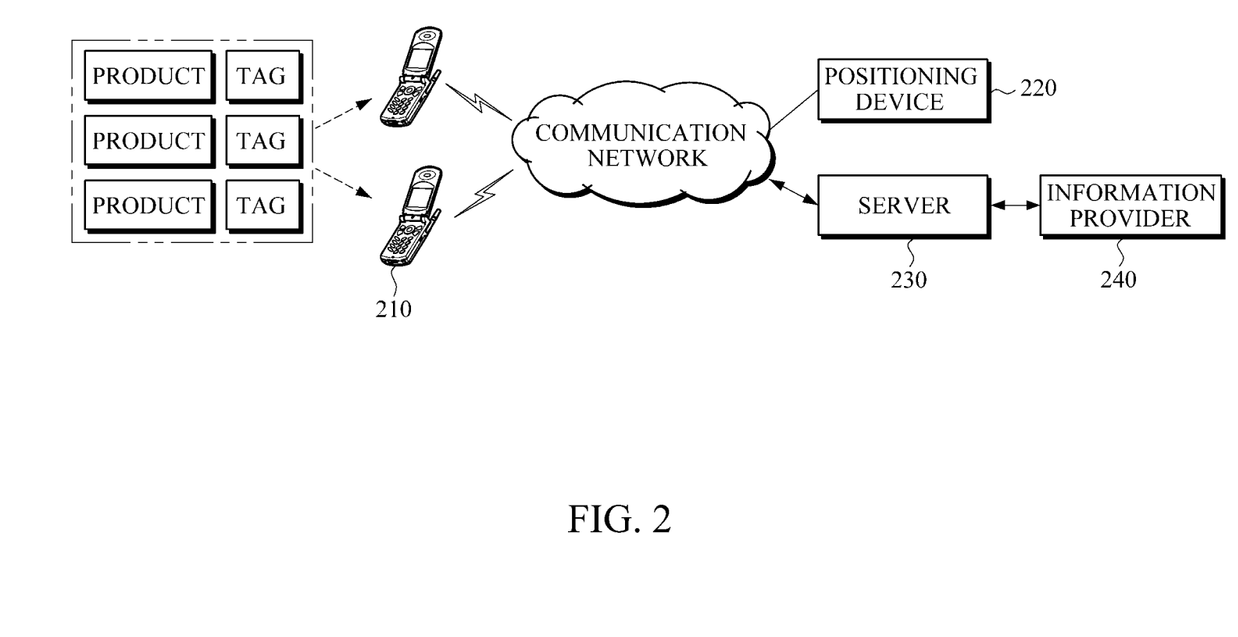
FIG. 2 is a schematic diagram illustrating an example of a mobile communication system to provide AR information according to an exemplary embodiment of the present invention.

FIG. 2 is a schematic diagram illustrating a mobile communication system to provide augmented reality (AR) information according to an exemplary embodiment of the present invention.

Referring to FIG. 2, the mobile communication system includes at least one mobile communication terminal 210, a positioning device 220 to provide position information of the mobile communication terminal 210, and a server 230 to provide AR information to the mobile communication terminal 210, which are interconnected with one another over a communication network. The server 230 is connected to an information provider 240 to receive the AR information from the information provider 240 and to provide the AR information to the mobile communication terminal 210.

The mobile communication terminal 210 generally refers to equipment with the ability to perform data communication/processing over a communication network. The communication network may be a mobile communication network. The mobile communication terminal 210 may be at least one of a Personal Digital Assistant (PDA) phone, a Global System for Mobile Communications (GSM) phone, and a Wideband Code Division Multiple Access (W-CDMA) phone, and the like.

The mobile communication terminal 210 receives and stores product information is corresponding to a tag pattern from the server 230 before the tag pattern is recognized.

The mobile communication terminal 210 may receive information about tag patterns in the vicinity thereof. A service area in which AR information is provided is divided into service cells based on criteria so that the information may be classified and managed in each service cell.

Examples of the criteria may include an administrative district, the amount of information to be provided, and a cell covered by a base station in a mobile communication system. The service cells may be contiguously arranged like cells of base stations, or may be discontinuously distributed depending on whether information is available to be provided to the mobile communication terminal 210.

The mobile communication terminal 210 determines if the mobile communication terminal 210 has entered a service cell or has moved to a new service cell. The mobile communication terminal 210 may receive a position signal from the positioning device 220 and determine a current position of the mobile communication terminal 210.

The positioning device 220 may be a system which provides physical position information of the mobile communication terminal 210 or identification information of a service cell in which the mobile communication terminal 210 is located. For example, if the service cell is a cell of a base station in a mobile communication system, the positioning device 220 may be a base station. In this case, the mobile communication terminal 210 may identify the base station using a pseudo-noise (PN) code sent from the base station. Further, the positioning device 220 may be a feature of the mobile communication terminal, such as a global positioning system (GPS) chip or the like.

The mobile communication terminal 210 may provide a user with desired is information among a variety of information associated with products or locations to which a tag pattern is attached. For example, as shown in FIG. 2, a plurality of mobile communication terminals 210 recognizing the same tag pattern may be provided with different information based on ages of users of the mobile communication terminals 210.

The server 230 may acquire and store user information, including age, gender, points of interest, and the like, in a variety of manners. For example, a user may access the server 230 and register the user information with the server 230, or subscriber information of a mobile communication terminal may be used as the user information. The mobile communication terminal 210 may transmit mobile identification information, such as an International Mobile Station Identity (IMSI) or a Mobile Identification Number (MIN), to the server 230. The mobile communication terminal 210 may transmit the user information to the server 230.

The server 230 detects and sends information corresponding to the acquired user information to the mobile communication terminal 210.

Figure 3:
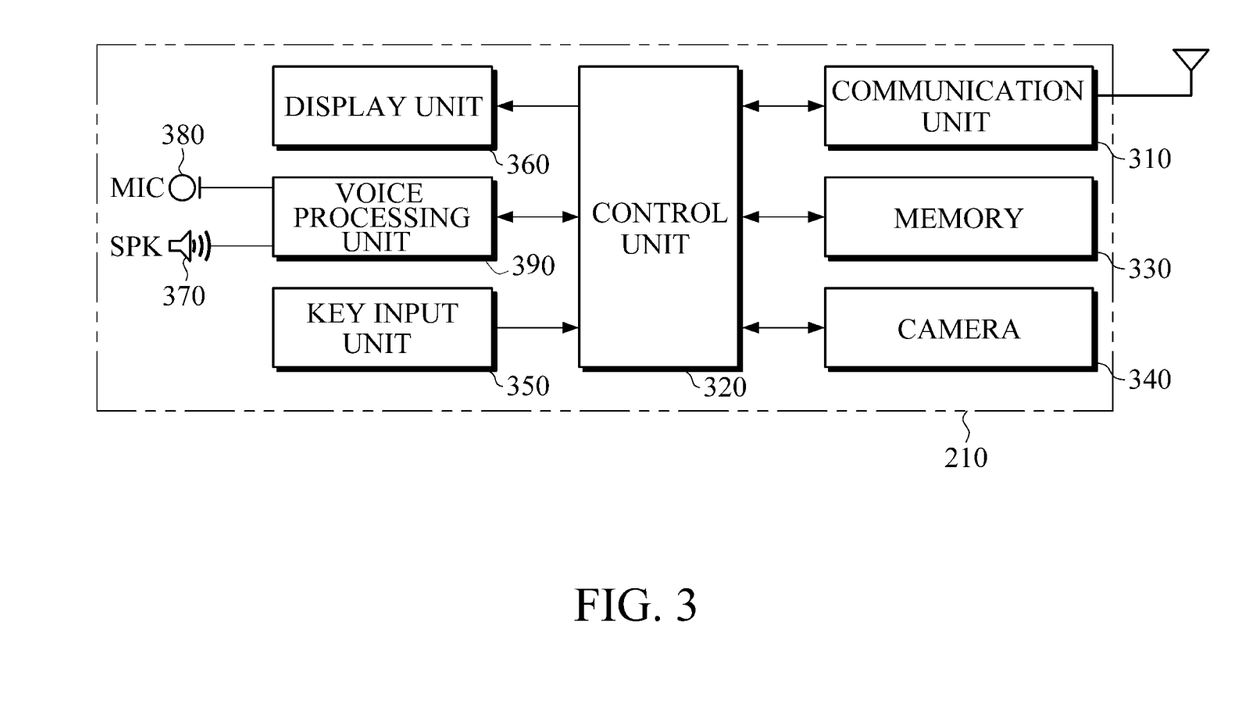
FIG. 3 is a block diagram illustrating an example of a mobile communication terminal according to an exemplary embodiment of the present invention.

FIG. 3 is a block diagram illustrating the mobile communication terminal 210 according to an exemplary embodiment of the present invention. The mobile communication terminal 210 includes a communication unit 310, a control unit 320, a memory 330, a camera 340, a key input unit 350, a display unit 360, a speaker 370, and a microphone 380.

The communication unit 310 includes an antenna and RF circuitry to process internal signals and external signals received over a communication network. The communication unit 310 receives and processes a position signal from the positioning device 220 and AR information from the server 230, and the communication unit 310 outputs the position signal and the AR information to the control unit 320. Further, the communication unit 310 is converts an AR information request signal from the control unit 320 into a radio signal and transmits the radio signal to the server 230.

The memory 330 may be a flash memory, random access memory (RAM), random operating memory (ROM), steady state memory, and the like, and the memory 330 may store the AR information received from the server 230 through the communication unit 310.

The camera 340 captures the tag pattern and outputs the captured tag pattern to the control unit 320. The tag pattern may or may not be stored in the memory 330. The key input unit 350 may be an interface, such as a microphone or a touch screen, for a user to enter information or may include physical keys.

The display unit 360 outputs still or moving image data and the speaker 370 outputs audio data. Such output components as the display unit 360 and the speaker 370 may output a notification message notifying receipt of AR information, AR information corresponding to the tag pattern, etc. The mobile communication terminal 210 may further include a voice processing unit 390 to process data from the microphone 380 and data conveyed to the speaker 370 from the control unit 320.

The control unit 320 may control the components of the mobile communication terminal 210. Upon receipt of a position signal of the mobile communication terminal 210 from the communication unit 310, the control unit 320 determines if the mobile communication terminal 210 has entered a new service cell or has exited a previous service cell. If control unit 320 determines that the mobile communication terminal 210 enters a new service cell, the control unit 320 transmits an AR information request signal to the server 230 through the communication unit 310, and stores AR information received from the server 230 in the memory 330. On the other hand, if the control unit 320 determines that the mobile communication is terminal 210 exits a previous service cell, the control unit 320 deletes the stored AR information corresponding to the previous service cell from the memory 330. Further, upon receipt of the captured tag pattern, the control unit 320 detects AR information corresponding to the tag pattern from the memory 330 and outputs the AR information through the output components.

Figure 4:
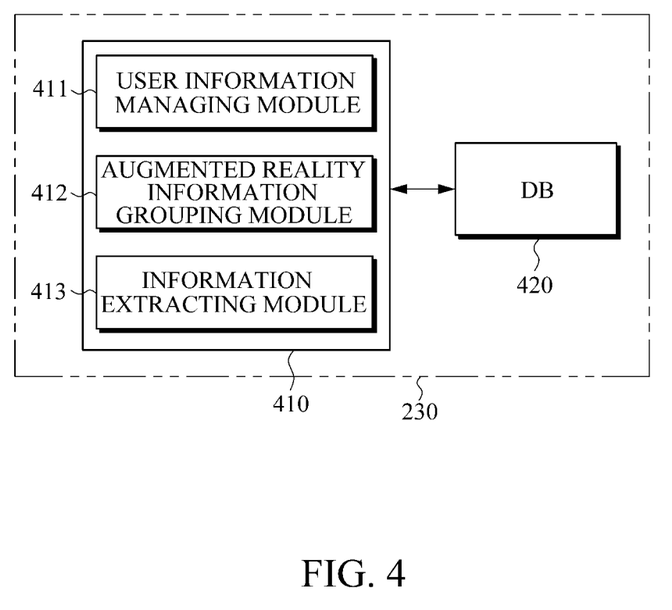
FIG. 4 is a block diagram illustrating an example of a server according to an exemplary embodiment of the present invention.

FIG. 4 is a block diagram illustrating the server 230 according to an exemplary embodiment of the present invention. The server 230 includes a user information managing module 411, an augmented reality (AR) information grouping module 412, an information extracting module 413, and a database (DB) 420. The user information managing module 411, the AR information grouping module 412, and the information extracting module 413 may be included in a control unit 410, but aspects are not limited thereto such that each may be physically and/or logically separate.

The user information managing module 411 stores user information of the mobile communication terminal 210 in the DB 420, and outputs the user information from the DB 420. The user information managing module 411 may receive the user information from the mobile communication terminal 210 or a website managed by the server 230.

The AR information grouping module 412 analyzes information input by an information provider, classifies the information into interest groups based on the user information, and stores the classified user information in the DB 420. Upon receipt of the AR information request signal from the mobile communication terminal 210, the information extracting module 413 extracts AR information corresponding to a service cell of the mobile communication terminal 210 and the user information from the DB 420, and the information extracting module 413 transmits the AR information to the mobile communication terminal 210.

Figure 5:
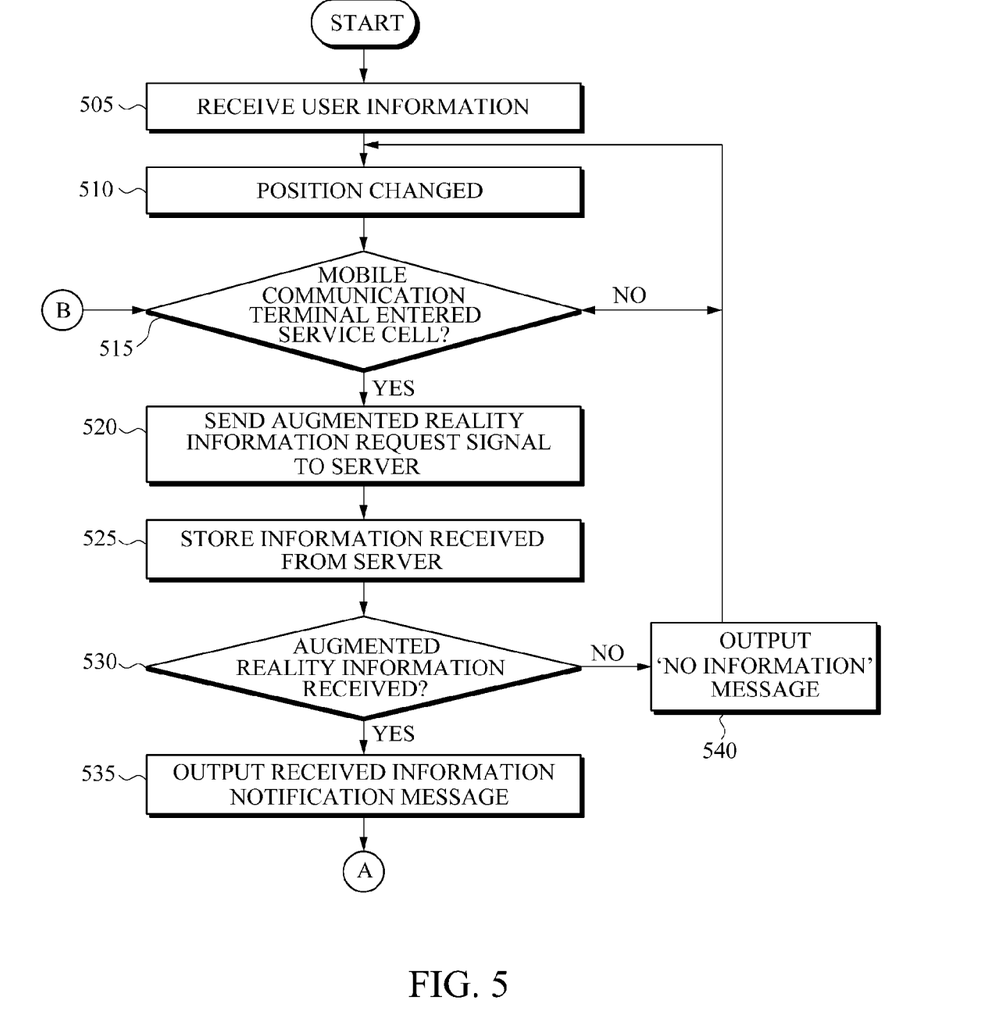
FIG. 5 and FIG. 6 are flowcharts illustrating a method for providing AR information of a mobile communication terminal according to an exemplary embodiment of the present invention.
Figure 6:
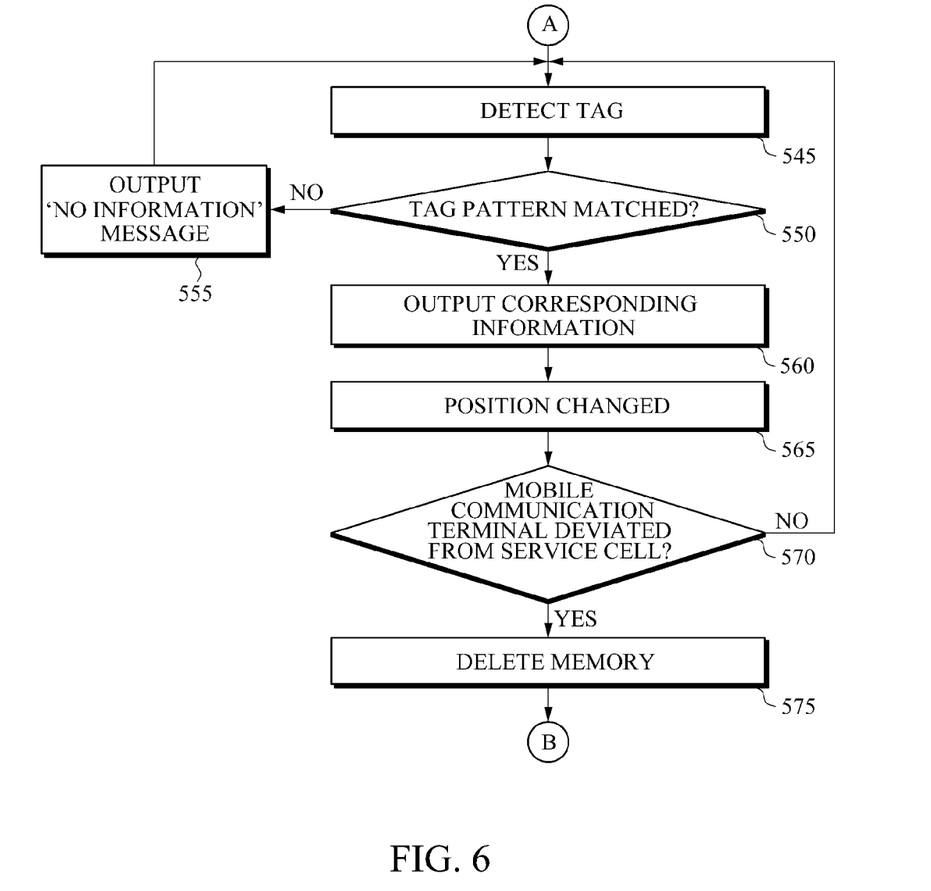

FIG. 5 and FIG. 6 illustrate methods of providing AR information by a mobile is communication terminal or a server in the mobile communication system according to exemplary embodiments of the present invention.

More specifically, FIG. 5 and FIG. 6 are flowcharts illustrating a method for providing AR information by a mobile communication terminal according to an exemplary embodiment of the present invention. Referring to FIG. 5, in operation 505, the mobile communication terminal receives user information of a user. The user information may be input through the key input unit or through wired or wireless communication with the mobile communication terminal. As described above, since the user information may be previously stored in the server, the mobile communication terminal may receive the user information from the server in operation 505. In operation 510, as the mobile communication terminal is moved, a position signal of the mobile communication terminal is received from the positioning device. In operation 515, it is determined whether the mobile communication terminal has entered a service cell.

If the mobile communication terminal is determined to have entered the service cell in operation 515, the mobile communication terminal sends an AR information request signal to the server in operation 520. The AR information request signal may include identification information of the mobile communication terminal and the user information in addition to the position information of the mobile communication terminal. The identification information of the mobile communication terminal and the user information may indicate aspects of the user to which the AR information may be tailored. If the mobile communication terminal is determined to not have entered the service cell in operation 515, the mobile communication terminal outputs a 'No information' message in operation 540. However, aspects are not limited thereto such that the mobile communication terminal need not output a message in response to is having not entered the service cell.

In operation 525, the mobile communication terminal stores information received from the server. In operation 530, the mobile communication terminal determines if AR information has been received from the server. If the AR information is determined to have been received in operation 530, the mobile communication terminal outputs a notification message notifying the receipt of the AR information in operation 535. If the AR information is determined to not have been received in operation 530, the mobile communication terminal outputs a 'No information' message in operation 540. However, aspects are not limited thereto such that the mobile communication terminal need not output a message if the AR information is determined to have been received or determined to not have been received in operation 530.

Referring to FIG. 6, in operation 545, the mobile communication terminal detects a tag pattern attached to a product within the service cell. The mobile communication terminal may detect the tag pattern attached to a product within the service cell according to the notification message.

In operation 550, the mobile communication terminal determines if the detected tag pattern matches one of tag patterns stored beforehand. If a matching tag pattern is detected in operation 550, the mobile communication terminal outputs information corresponding to the tag pattern through the output component in operation 560. If a matching tag pattern is not detected in operation 550, the mobile communication terminal outputs a 'No information' message in operation 555. However, aspects are not limited thereto such that the mobile communication terminal need not output a message if a matching tag pattern is not detected in operation 550.

As the mobile communication terminal is moved in operation 565, the mobile communication terminal determines if it has exited the previous service cell in operation 570. If is the mobile communication terminal is determined to have exited the previous service cell in operation 570, the mobile communication terminal deletes the information from the memory in operation 575. After operation 575, the mobile communication terminal may return to perform operation 515.

For convenience, the entrance into and exit from a service cell have been separately described with reference to FIG. 5. However, if the entrance into a new service cell and the exit from a previous service cell occur at a same time in operation 515, the information may be deleted from the memory following the operation 515. On the other hand, if the mobile communication terminal has exited from the service cell prior to the operation 545, the information may be deleted from the memory prior to the operation 545 and the operation 510 may then be performed.

Figure 7:
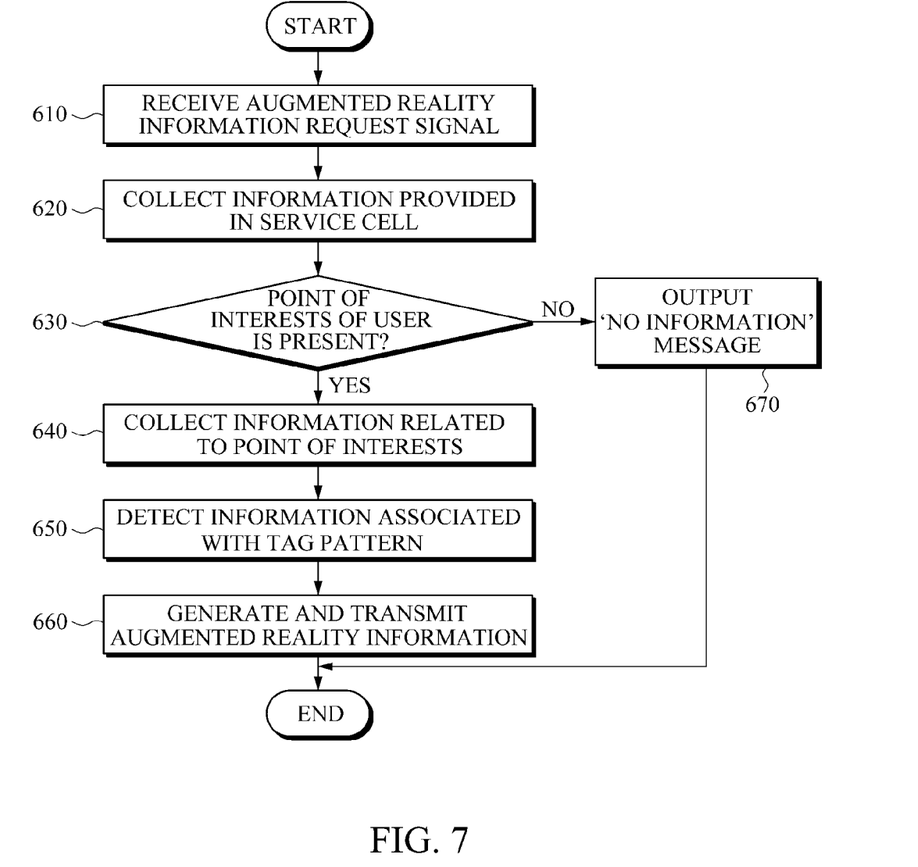
FIG. 7 is a flowchart illustrating a method for providing AR information of a server according to an exemplary embodiment of the present invention.

FIG. 7 is a flowchart illustrating a method for providing AR information by a server according to an exemplary embodiment of the present invention. Referring to FIG. 7, in operation 610, the server receives the AR information request signal from the mobile communication terminal. As described above, the AR information request signal may include the position information, the user information, the identification information of the mobile communication terminal, and the like. The position information may be service cell identification information or physical position information of the mobile communication terminal. The server may read the service cell identification information from the position information of the mobile communication terminal.

In operation 620, the server retrieves information to be provided in the service cell in which the mobile communication terminal is located. In operation 630, the server determines if any of the retrieved information corresponds to the user information. For example, if the user is information includes 'cosmetics, books, and movies' as points of interest of the user, the server determines if the points of interest may be provided or present in the service cell.

If it is determined that there is information matching the points of interest of the user in operation 630, the server collects the information matching the points of interest of the user in operation 640. In operation 650, the server detects a tag pattern corresponding to the points of interest and information associated with the tag pattern from among the collected information. The same tag pattern may be associated with multiple pieces of information. The server selects information corresponding to the user information from the multiple pieces of information associated with the tag pattern according to a variety of criteria. Examples of the criteria may include age, season, weather, time, and the like. For example, the server may detect the user's desired information from among the multiple pieces of information using the user's age.

In operation 660, the server generates AR information from the at least one tag pattern and the information associated with the at least one tag pattern and transmits the AR information to the mobile communication terminal.

If it is determined in operation 630 that there is no information matching the points of interest of the user, the server generates a 'No information' message and sends the message to the mobile communication terminal in operation 670. However, aspects are not limited thereto such that the server need not generate a message or send the message to the mobile communication terminal if it is determined that there is not information matching the points of interest of the user.

Figure 8:
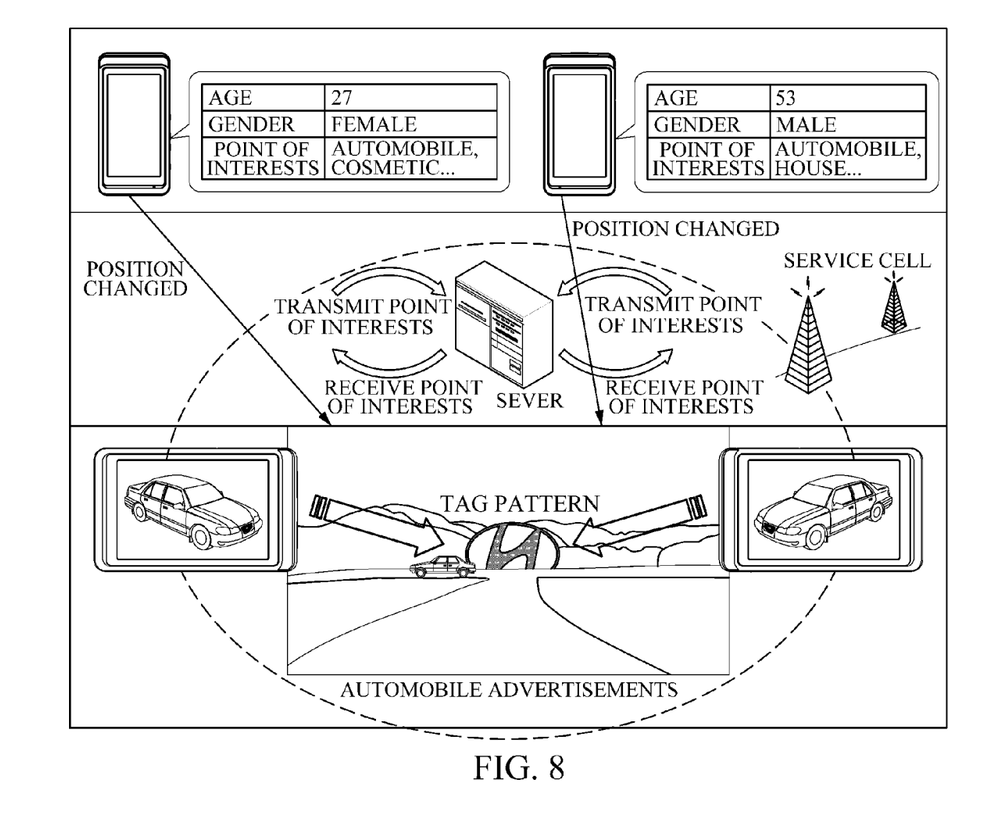
FIG. 8 is a diagram illustrating an example method for providing a same tag pattern to provide different information to each user according to an exemplary embodiment of the present invention.

FIG. 8 is a schematic diagram illustrating a method for using a same tag pattern to provide different information to each user according to an exemplary embodiment of the present is invention. For example, there are a 27-year-old user 'A' and a 53-year-old user 'B' each having set automobiles as a point of interest in each of their respective mobile communication terminals. If the mobile communication terminals enter a service cell where a dealership of 'H Motor Company' is located and request AR information from a server, the server generates the AR information to provide automobile information of the 'H Motor Company' and sends the AR information to each of the mobile communication terminals. The server simultaneously sends the logo of the 'H Motor Company' as a tag pattern to each of the mobile communication terminals, for example. AR information about a new sport utility vehicle (SUV) model is sent to the user 'A', while AR information about a luxury sedan is sent to the user 'B', for example, i.e., the AR information is sent to the mobile communication terminals of the user 'A' and the user 'B' according to the users' ages.

If a user desiring real estate information presets his or her points of interest to include real estate through a variety of information input manners, the server transmits the desired information to the user based on the user's points of interest. For example, among real estate advertisements posted by real estate agencies, the user may obtain further desired information, such as an interior structure of a house, in the form of two-dimensional (2D) or three-dimensional (3D) data.

For example, if a user wishes to obtain real estate information regarding a house for lease, the user selects an item 'houses for lease' as a point of interest, and may select and store desired region and lease price, such as ' Sangam-dong, Mapo-gu, Seoul' and 'under 150 million', respectively. If the user passes by a real estate agency after setting his or her point of interest as real-estate lease, a server automatically notifies the user of corresponding information so that the user may detect a tag and view details of the point of interest and an interior structure is of a house in 2D or 3D format.

If the user visits a region registered as one of his or her points of interest, the user may check information, such as the position, lease price, interior structure of a house for lease, a phone number of a real estate agency, and the like, in real time through his or her mobile communication terminal, which has automatically downloaded AR information associated with his or her points of interest.

Further, there may be provided a system which allows audiences to easily locate their seats in a cinema through a pattern on a screen. More specifically, an individual may locate his or her seat in a cinema by detecting a pattern on a screen and recognizing his or her seat from the pattern.

For example, an audience downloads reservation information about a desired film to his or her mobile communication terminal. If the audience looks at a film poster of desired film posted on a cinema entrance through his or her mobile communication terminal, a main character of the film may inform the audience of the location of a screen where the film is played. When the audience looks at a mark on the screen through his or her mobile communication terminal, his or her seat may be displayed on the mobile communication terminal so that he or she may easily find his or her seat.

Information about regional products, leisure activities, events, shopping malls, etc. may be graphically provided to users using augmented reality based on positions of the users. For example, users located at Yeoncheon in Gyeonggi-do may be provided with information about rafting on the Hantan River, or users at Boryong may be provided with information about the mud festival, mud cosmetics, etc. Among events at a specific region, an event catering or restaurant corresponding to a user's taste may be provided. For a department store, information is about desired products on sale or new products may be provided.

AR data may be differently provided with the passage of time to give more appropriate information. For example, audiences visiting Pusan to attend the Pusan International Film Festival (PIFF) may be provided with information about events and films presented on that day. As another example, flash advertisements may be provided at night and sunscreening cap advertisements may be provided at day so that products may be graphically provided to consumers. As another example, consumers may be provided with information about different products for breakfast, lunch, and dinner. Hence, it is possible to provide a variety of information with the same tag.

Customers may be provided with information about clothes suitable for the weather or season based on weather or season information. For example, styles suitable for the weather may be suggested to users based on weather and user information, and/or clothes suitable for the weather or season may be provided to users based on gender or age information. As another example, a film poster with scenes corresponding to the weather may be provided according to the weather information, or information about other films which are currently playing at the same cinema may also be provided. Hence, it is possible to obtain a space free information effect or multiple advertisements of the same film with a single film poster.

As another example, music files suitable for rainy days or user biorhythm may be recommended. If the user selects one of the music files, the selected music file may be immediately sent to the user's mobile communication terminal, for example, as a purchase, a ringtone, or gift services.

For example, if a server receives user biorhythm information composed of physical, emotional, and intellectual cycles from a mobile communication terminal of the user and weather information on a rainy day, the server may recommend to the user a piece of music related to rain while taking the user's emotional cycle into account. If the user looks at an umbrella through his or her mobile communication terminal, i.e., the camera captures an image of an umbrella and displays the image of the umbrella on the display of the mobile communication terminal, the mobile communication terminal may recommend or reproduce a song, for example, 'Like rain, like music', sung by Hyun-Sik Kim. If the user looks at the Youngdong Bridge through his or her mobile communication terminal while passing by the Youngdong Bridge, the mobile communication terminal may recommend or reproduce a song of 'Raining on Youngdong Bridge'. At night, the mobile communication terminal may recommend or reproduce a song of 'Raining on a sleepless night'. As another example, the mobile communication terminal may provide may provide advertisements on snow tires or snow chains from automobile accessory shops on snowy days or advertisements on air conditioners for vehicles or antibacterial filters for air conditioners on hot days.

The exemplary embodiments can be implemented as computer readable code in a computer readable recording medium. Code and code segments constituting the computer program can be easily inferred by a skilled computer programmer in the art. The computer readable recording medium includes all types of recording media in which computer readable data can be stored. Examples of the computer readable recording medium include a ROM, a RAM, a CD-ROM, a magnetic tape, a floppy disk, an optical data storage, combinations thereof, and the like. In addition, the computer readable recording medium may be distributed to computer systems over a network, in which computer readable code may be stored and executed in a distributed manner.

As apparent from the above description, since the mobile communication terminal is stores information corresponding to a tag beforehand, it is possible to provide the information corresponding to the tag immediately after the user recognizes the tag.

Further, since the tag is associated with multiple pieces of information, it is possible not only to increase the efficiency of the tag but to cater to users' diversified tastes.

In addition, since the mobile communication terminal automatically deletes information received within a service cell if the mobile communication terminal exits the service cell, it is possible to efficiently use limited storage of the mobile communication terminal.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for providing augmented reality (AR) information, the method comprising:
sending an AR information request comprising position information from a mobile communication terminal based on a determination that the mobile communication terminal has entered a service cell;
receiving the AR information in the service cell in the mobile communication terminal; and
storing the received AR information in the mobile communication terminal,
wherein an amount of AR information available in a plurality of service cells in a service area is determined and the AR information is managed in each service cell, and
wherein the layout of the plurality of service cells in the service area is divided according to the amount of the AR information available in each of the service cells.

2. The method of claim 1, further comprising, after the receiving of the AR information, outputting a notification message indicating that the AR information has been received.

3. The method of claim 1, further comprising, after the storing of the AR information, outputting a notification message indicating that the AR information has been received.

4. The method of claim 1, further comprising determining if the mobile communication terminal has entered the service cell.

5. The method of claim 4, wherein the mobile communication terminal determines that the mobile communication terminal has entered the service cell according to the position information or identification information of the service cell.

6. The method of claim 1, further comprising:
   detecting a tag pattern;
   determining if a same tag pattern as the detected tag pattern is stored in the mobile communication terminal; and
   outputting AR information corresponding to the tag pattern if the same tag pattern as the detected tag pattern is stored in the mobile communication terminal.

7. The method of claim 1, further comprising deleting the stored AR information if the mobile communication terminal is determined to have exited from the service cell.

8. The method of claim 7, wherein the mobile communication terminal determines that the mobile communication terminal has exited the service cell according to received position information.

9. The method of claim 1, wherein the AR information request comprises identification information of the mobile communication terminal or user information of a user, and the AR information corresponds to the identification information of the mobile communication terminal or the user information of the user.

10. The method of claim 9, wherein the user information of the user comprises a point of interest.

11. A method for providing augmented reality (AR) information, the method comprising:
   receiving an AR information request comprising position information from a mobile communication terminal indicating that the mobile communication terminal has entered a service cell;
   determining AR information in the service cell in which the mobile communication terminal is located;
   transmitting the AR information to the mobile communication terminal;
   determining an amount of AR information available in a plurality of service cells in a service area; and
   managing the AR information in each service cell,
   wherein the layout of the plurality of service cells in the service area is divided according to the amount of the AR information available in each of the service cells.

12. The method of claim 11, wherein the AR information request further comprises identification information of the mobile communication terminal or user information of a user.

13. The method of claim 12, wherein the determining of the AR information comprises:
   selecting tag patterns according to the identification information of the mobile communication terminal or the user information of the user from tag patterns available in the service cell; and
   selecting information according to the user information or external environment information from among at least information associated with each of the tag patterns.

14. A mobile communication terminal, comprising:
   a memory to store information; and
   a control unit to generate an augmented reality (AR) information request comprising position information of the mobile communication terminal if the mobile communication terminal is determined to have entered a service cell in which AR information is available, to receive the AR information in response to the AR information request, and to store the received AR information in the memory,
   wherein an amount of AR information available in a plurality of service cells in a service area is determined, and the AR information is managed in each service cell, and
   wherein the layout of the plurality of service cells in the service area is divided according to the amount of the AR information available in each of the service cells.

15. The mobile communication terminal of claim 14, further comprising:
   a camera to capture a tag pattern; and
   an output unit to output internal data,
   wherein the control unit determines if the captured tag pattern is the same as a tag pattern of the received AR information stored in the memory, and outputs AR information associated with the tag pattern according to the determination.

16. The mobile communication terminal of claim 14, wherein the control unit deletes the AR information stored in the memory if the mobile communication terminal is determined to have exited the service cell.

17. The mobile communication terminal of claim 14, wherein the AR information request comprises identification information of the mobile communication terminal or user information of a user.

18. The mobile communication terminal of claim 17, wherein the user information of the user comprises a point of interest.

19. A server to provide augmented reality (AR) information to a mobile communication terminal, the server comprising:
   a database to store at least one tag pattern available in a service cell and information associated with the at least one tag pattern, and to store user information; and
   a control unit to classify interest groups based on the stored user information, and to extract the AR information according to the interest groups and the service cell in response to an AR information request indicating that a mobile communication terminal has entered the service cell, the AR information comprising the at least one tag pattern and the information associated with the at least one tag pattern, to determine an amount of AR information available in a plurality of service cells in a service area, and to manage the AR information in each service cell,
   wherein the layout of the plurality of service cells in the service area is divided according to the amount of the AR information available in each of the service cells.

20. The server of claim 19, wherein the AR information request further comprises identification information of the mobile communication terminal or a point of interest of a user.

21. The server of claim 20,
   wherein the database further comprises a point of interest of a user corresponding to identification information of the mobile communication terminal, tag pattern classification information based on the point of interest, and external environment information, and
   wherein the control unit selects tag patterns according to the identification information of the mobile communication terminal or according to the point of interest of the user from among tag patterns available in the service cell in the database, and selects information according to the point of interest or external environment information from among at least information associated with each of the tag patterns.

22. A mobile communication system, comprising:
a server to store augmented reality (AR) information, the AR information comprising at least one tag pattern available in a service cell and information associated with the at least one tag pattern, to determine an amount of AR information available in a plurality of service cells in a service area, and to manage the AR information in each service cell; and
a mobile communication terminal to receive and to store the AR information from the server based upon entry of the mobile communication terminal into the service cell,
wherein the layout of the plurality of service cells in the service area is divided according to the amount of the AR information available in each of the service cells.

23. The system of claim 22, wherein the mobile communication terminal captures a tag pattern in the service cell, determines if the captured tag pattern is the same as the tag pattern of the stored AR information, and displays the stored AR information according to the determination.

24. The system of claim 22, further comprising:
a positioning device to provide position information of the mobile communication terminal.

25. The system of claim 24, wherein the mobile communication terminal sends an AR information request to the server, the AR information request comprising the position information.

26. The system of claim 22, wherein the server selects the AR information received by the mobile communication terminal according to identification information of the mobile communication terminal or user information of a user.

27. The system of claim 26, wherein the server selects the AR information received by the mobile communication terminal in response to an AR information request received from the mobile communication terminal, the AR information request comprising the identification information of the mobile communication terminal or the user information of the user.

28. The system of claim 26, wherein the server stores the identification information of the mobile communication terminal or the user information of the user.

29. The system of claim 22, wherein the mobile communication terminal deletes previously stored AR information upon entry of the mobile communication terminal into the service cell.

30. A method for providing augmented reality (AR) information, the method comprising:
sending an AR information request comprising position information from a mobile communication terminal based on a determination that the mobile communication terminal has entered a service cell;
receiving the AR information request in a server;
determining AR information comprising at least one tag pattern and information associated with the at least one tag pattern, the at least one tag pattern being available in the service cell in which the mobile communication terminal is located according to the position information;
transmitting, from the server to the mobile communication terminal, the determined AR information; and
storing the received AR information in the mobile communication terminal,
determining an amount of AR information available in a plurality of service cells in a service area, and
managing the AR information in each service cell,
wherein the layout of the plurality of service cells in the service area is divided according to the amount of the AR information available in each of the service cells.

31. The method of claim 30, further comprising:
determining if the mobile communication terminal has entered the service cell,
wherein the AR information request is sent if the mobile communication terminal is determined to have entered the service cell.

32. The method of claim 30, further comprising:
capturing a tag pattern in the service cell with the mobile communication terminal;
determining if the captured tag pattern is the same as the tag pattern of the stored AR information; and
displaying the stored AR information according to the determination.

* * * * *